United States Patent [19]

Craven et al.

[11] Patent Number: 4,806,051

[45] Date of Patent: Feb. 21, 1989

[54] METHOD FOR FORMING A TEMPLATE

[75] Inventors: Malcolm Craven; Mason S. Small, both of Leeds, England

[73] Assignee: Automated Machinery System, Inc.

[21] Appl. No.: 159,532

[22] Filed: Feb. 11, 1988

[30] Foreign Application Priority Data

Feb. 27, 1987 [GB] United Kingdom ............... 8704665

[51] Int. Cl.⁴ .............................................. B23C 0/00
[52] U.S. Cl. ...................................... 409/84; 409/137; 144/144.5 R
[58] Field of Search .................... 409/84, 137, 132; 144/144, 144.5

[56]  References Cited

U.S. PATENT DOCUMENTS

| 4,244,669 | 1/1981 | Puritz et al. | 409/137 |
| 4,501,308 | 2/1985 | Sherman | 144/144.5 |
| 4,575,290 | 3/1986 | Adair | 409/132 |

Primary Examiner—Leon Scott, Jr.
Attorney, Agent, or Firm—Bacon & Thomas

[57] ABSTRACT

A method for forming a template for use in the garment manufacture industry. Apparatus used in the method comprises a support table (10) having an opening (26) therein. A router (13) is mounted below the support table for vertical movement relative thereto and drives a routing cutter (15) that may extend through the opening (26). A blank comprising hinged, overlying plates is positioned so that part of the blank overlies the opening (26) beneath a stylus (38) which can guide a pattern attached to the blank so that the cutter forms a track in the blank having a shape corresponding to the shape of the pattern. The track is cut simultaneously through both plates, and separating cuts are made across the hinge line through the thickness of the first plate only. During the cutting operation cut material is extracted through a tube (27) connected to a source of vacuum.

4 Claims, 4 Drawing Sheets

METHOD FOR FORMING A TEMPLATE

This invention relates to a method for forming a template.

The invention is particularly concerned with the manufacture of templates for the clothing manufacturing industry, but can find other uses. One common form of template used in the clothing industry comprises two plates hinged together so that a multi-layer fabric workpiece may be sandwiched between the plates. The lower plate is formed with a track through which the needle of a sewing machine may pass in order to stitch together the layers of the workpiece where these overlie. The template is moved to follow the desired profile by engagement of the template track with guide means on the sewing machine.

Templates of the aforesaid type that are used in the high value garment industry, for example in the manufacture of jackets, suits and outer clothing, are commonly in the form of precision-made stitching jigs, designed to ensure that correct stitching lines are achieved and also to introduce fullness between different fabric layers that go up to make the respective garment part. There is a need to provide much simpler and cheaper templates for use with lightweight fabrics at the cheaper end of the garment industry, and the invention seeks to provide a method that will facilitate the manufacture of such templates.

According to the invention we provide a method of making a template from a blank comprising first and second plates that overlie one another and are hinged together along a substantially rectilinear hinge line by a flexible web of material, the method comprising supporting the blank on a support table with the first plate lowermost, releasably securing a pattern to the upper surface of the second plate, positioning the blank so that it lies over a rotary cutting tool movable upwardly and downwardly through an opening in the support table with an edge region of the pattern lying against a stylus secured above the opening in the support table, the stylus having a circular periphery and being substantially in axial vertical alignment with the cutting tool, cutting a track through the thickness of both plates while moving the blank so that the edge of the pattern travels in contact with the periphery of the stylus, and making separating cuts through the thickness of the first plate only, the separating cuts extending respectively from start and finish regions of the track across the hinge line to a free edge of the first plate.

After the described cutting operations are completed it will be understood that a guide track has been formed in the second plate, and that the first plate has been cut to form an edge that is substantially coincident with the inner edge of the guide track. The remaining material of the first plate has been separated by the separating cuts and can be discarded as scrap. The guide track has a contour matching the contour of the edge of the pattern used during manufacture.

The apparatus used in the method can be manufactured to be robust and relatively cheap, and this, coupled with the simplicity of the method, renders it possible for template users to manufacture their own templates.

The resulting template is removed from the support table, the pattern is removed from the second plate and the template can be ready for use. In use, the first plate is uppermost, the second plate being supported on the feed table of a sewing machine. The fabric workpiece is positioned and held between the plates to overlie the track and stitching is effected along the line of the track.

The template will usually be guided by engagement of the track with a guide member on the sewing machine. Such templates are commonly driven relative to the guide member by engagement of an edge of the template with drive means driven from the sewing machine drive. The method also makes possible the manufacture of templates of this type, by performance of the additional preferred manufacturing step wherein after cutting the track and making the additional cuts, the stylus is replaced by a second stylus of greater diameter, and the blank is moved so that the edge of the pattern travels in contact with the periphery of the second stylus while the cutter cuts through the second plate to form an additional cut extending parallel to the track. Thus the edge of the second plate, which in end use is the lower plate, can be formed with a drive edge parallel to the track.

In some templates it is necessary to provide means for introducing fullness into one of the garment parts to be stitched together. This is usually achieved by using a fulling member between the plates and capable of being received in an opening in the top plate. Such an opening can be formed by an optional further manufacturing step in which, after cutting the track and forming the additional cuts, an additional opening is cut through the thickness of the first plate only, the additional opening lying between the track and the hinge line but not intersecting either the track or the hinge line.

The method of the invention has numerous advantages. Thus, the pattern and the stylus are fully visible, so making it very easy for an operator closely and accurately to follow the pattern edge during the cutting operations. The first plate rests directly on the support table without any intervening element, so preventing any unwanted rocking of the blank on the support table. The cutter is effectively shielded by the opening in the support table and the stylus located above that opening, so that inadvertent and possibly dangerous contact with the cutter is inhibited.

An extraction channel may open into a side wall of the opening in the support table. If such channel is connected to a source of vacuum then it acts to extract the cuttings produced on operation of the cutting tool. The extraction from the immediate vicinity of the cutting operation can be highly efficient, acting to reduce atmospheric pollution and to prevent such cuttings accumulating on the top of the support table or falling onto the cutter drive means and floor beneath the support table.

In order that the invention may be better understood specific embodiments of methods in accordance therewith will now be described in more detail, by way of example only, with reference to the accompanying drawings in which.

Figure 1:
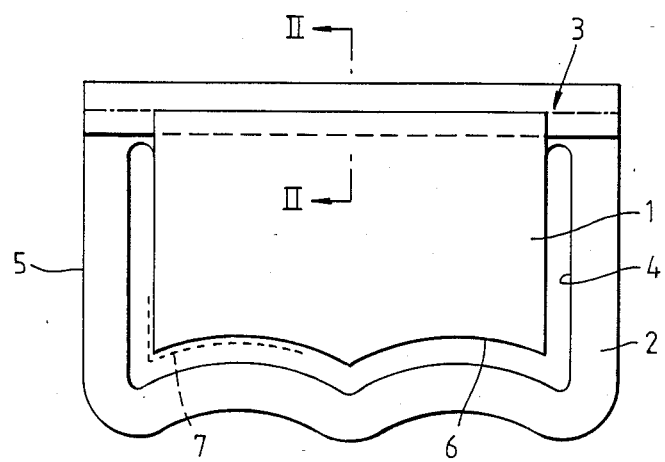
FIG. 1 is a plan view of a typical stitching template for use in the lightweight garment industry.
Figure 2:
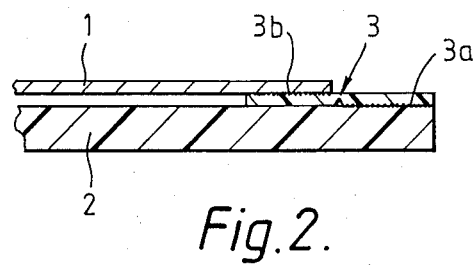
FIG. 2 is a cross-section on the line II—II of FIG. 1.

FIG. 1 shows a typical stitching template comprising upper and lower plates 1 and 2 that are hinged at 3 in order that the plates may lie flat one on the other and that they may be separated to accommodate one or more pieces of fabric therebetween. The hinge is formed by a strip of flexible material having a longitudinal score line, secured by adhesive 3a to the upper surface of the lower plate 2 to one side of the score line, and secured by adhesive 3b to the lower surface of the upper plate 1 to the other side of the score line, as shown in FIG. 2. The lower plate 2 is cut so as to have a slot forming a track 4 of constant width and has an outer edge 5 that extends substantially parallel to the edges of the track and is thus of the same profile as the track. The upper plate 1 is cut to have an edge 6 that overlies, and is substantially coincident with the inner edge of the track. The upper plate may be of a metallic material such as aluminium, and the lower plate may be of a plastics material, such as polyvinylchloride. The hinge material may be of a flexible plastics material such as polypropylene.

In use, a template with, normally, two overlying garment parts held between the top and bottom plates and extending across the track 4, is loaded into a sewing machine and guided by means following the track 4 so that a stitch line 7 is formed in that region of the fabric overlying the track 4 at an accurately predetermined distance from the edge 5 of the lower plate. The fabric parts are thus sewn together along a required profile. The template is moved by drive means that frictionally engage the edge 5.

Figure 5:
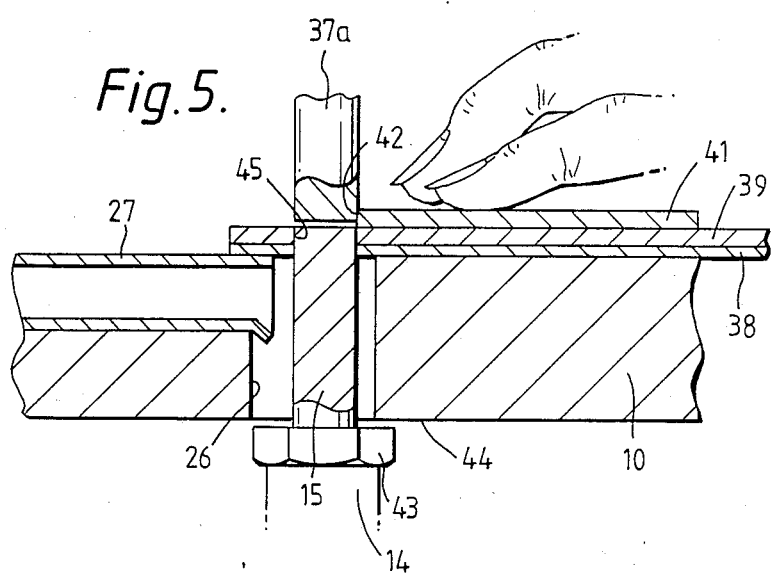
FIG. 5 is an enlarged section of part of the apparatus of FIG. 4, illustrating the manner in which the apparatus is used.
Figure 4:
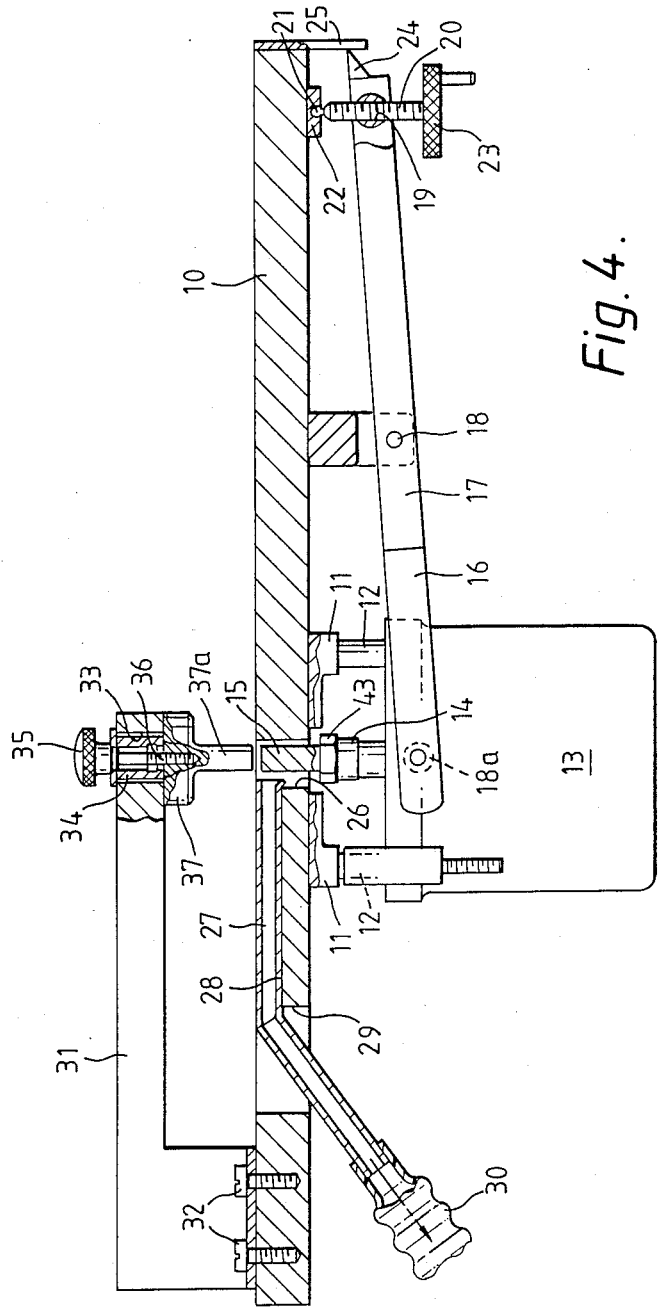
FIG. 4 is a cross-section through apparatus for use in the method of the invention.

FIGS. 4 and 5 show the apparatus used in the manufacture of the template shown in FIG. 1. The apparatus comprises a support table 10 having legs (not shown) or other means whereby it may be supported at an appropriate height above the ground. Below what is desirably a central region of the support table a plurality of mounts such as 11 are secured to the underside of the table, the mounts having projecting therefrom downwardly extending vertical guide rods 12. The guide rods 12 engage with guide bores in a carriage 13 so that the carriage is guided for movement perpendicular to the support table. The carriage is part of or supports a router having a drive spindle 14 to which a routing cutter 15 is secured in known manner.

The carriage 13 is supported between the arms 16 of a yoke formed integrally with a lever arm 17 pivotally mounted at 18 below the support table. The ends of the arms of the yoke 16 have bearings 18a in which are pivotally engaged pins projecting from the carriage. The lever arm is slotted in the region of pivot 18 so allowing the necessary relative movement between the yoke and the table.

At the end opposite to the yoke 16 the lever arm 17 has an internally threaded bore 19 through which a lead screw 20 extends, the lead screw having a ball end 21 engaging a bearing pad 22 below the support table. The lead screw has a hand wheel 23 by which it may be rotated. It will be evident that rotation of the lead screw causes the carriage and thus the router and cutter to be raised and lowered with respect to the support table. The height of the cutter may be indicated at the end of the table by a pointer 24 moving along a calibrated scale 25.

The support table is formed with an opening 26 of circular cross-section into which the cutter 15 projects. The opening is desirably circular in cross-section, and preferably no less than twice the diameter of the cutter. A tubular pipe 27 is sunk into a channel 28 formed in the surface of the support table to terminate in the upper end of the opening 26. The pipe, at its opposite end, extends downwardly through an opening 29 in the support table and its free end is connectable by a hose 30 to a source of vacuum.

A bridge 31 is secured to the upper surface of the table in any suitable manner, such as by screws 32. A bore 33 is formed in the free end of the bridge, and a liner 34 is provided in the bore and holds captive a lockscrew 35. The threaded end 36 of the lockscrew is engagable in a tapped bore in a stylus 37 in order to secure the stylus in position on the bridge. The stylus has a guide portion 37a with a circular periphery, and the arrangement is such that the guide portion is coaxial with the cutter 15.

Figure 3:
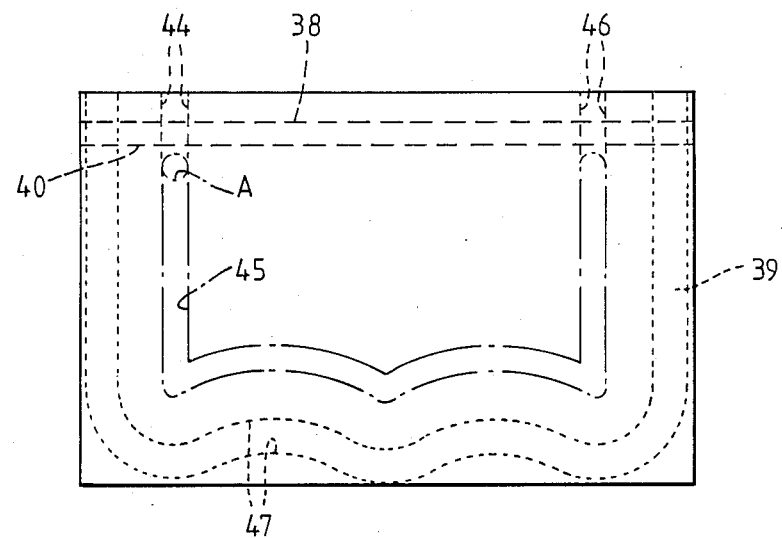
FIG. 3 is a plan view of a blank from which the template of FIG. 1 may be formed.

The apparatus can be used to form a template as shown in FIG. 1 from a blank as shown in FIG. 3. The blank comprises first and second plates 38, 39 hinged together by a flexible strip 40. In order to form the template a stylus having a guide portion 37a of the required diameter is secured to the bridge. The router and cutter are lowered to a position wherein the cutter 15 lies below the surface of the support table 10, as shown in FIG. 4. The blank is then placed so that the first plate 38 rests on the surface of the table. A pattern 41 having an edge 42 that corresponds to the required stitching track profile is releasably secured, e.g. by a peelable, double-sided adhesive tape, to the upper surface of the second plate 39. The blank is advanced so that a starting point of the edge 42 of the pattern 41 bears against the stylus 37. The router is then operated to cause rotation of the cutting tool 15 and is raised to a position wherein the cutting tool penetrates through the thickness of both plates 38 and 39 and lies slightly below the lower end of the stylus 37. It will be noted that the stylus prevents any significant upward movement of the template during this operation. Upward movement of the cutting tool can be limited to ensure that there is no engagement between the tool and the stylus, for example by adjustable stop means 43 on the carriage 13 engaging the mounts 11. The first action of the cutter is thus to cut a circular hole (A in FIG. 3) through both plates 38 and 39 at the beginning of the guide track. The cutter is then withdrawn so that it can penetrate only the thickness of the first plate 38 and the blank is moved so that a separating cut (along broken lines 44 in FIG. 5) is made between the beginning of the guide track and the edge of the blank, crossing the hinge line. The blank is moved back to the original position, and the cutter advanced back to full depth.

The blank is then moved so that the edge of the pattern 42 follows in contact with the stylus guide portion 37a, and slots 45 are cut simultaneously in both plates 38 and 39 during such movement, as indicated by dash-dot lines in FIG. 3. When a finishing point of the edge 42 of the pattern is reached the cutter is lowered to a depth where it can penetrate only the thickness of the first plate 38, and a second separating cut is made (along broken lines 46 in FIG. 5) from the end of the guide track across the hinge line to the edge of the blank. The router and cutting tool are then lowered back into the opening 26 and rotation of the cutter is stopped. During the whole of the cutting operation vacuum is applied to the extraction tube 27, and due to the location of the open end of the tube within the opening 26 this has the effect of very efficiently clearing the material that has been cut from the plates 1 and 2. Because of the position of the extraction tube it is found that little or no cut material builds up on the surface of the support table or falls to the ground below the support table.

If the edge of the second plate 39 is to be shaped to match the contour of the guide track, as shown in FIG. 1, then this may readily be effected by replacing the stylus 38 with a stylus of greater diameter, without removing the pattern 41 from the template. The cutter will then operate along a line (dotted lines 47 in FIG. 3) parallel to the original cut as the pattern is moved in engagement with the larger stylus. Clearly, parallel tracks can be formed in the template by use of styli of different diameters.

When all cutting operations are complete the blank is removed from the table. The material of the first plate that lies outside the track 45 and the separating cuts 44, 46 is free from the remainder of the template and is discarded. Similarly any free material resulting from formation of the shaped edge on the second plate 39 is discarded. The template is then ready for use as described with reference to FIG. 1, the first plate 38 being the upper plate 1 in use and the second plate 39 being the lower plate 2.

Figure 6:
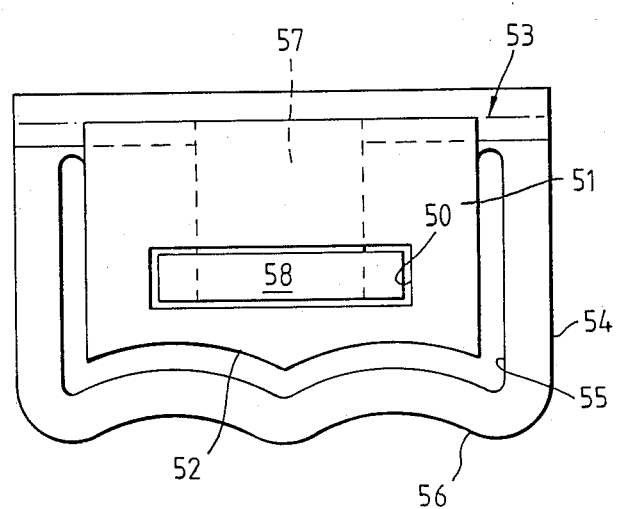
FIG. 6 shows an alternative form of template that can be manufactured by the method of the invention.

FIG. 6 shows an alternative form of template, having an opening 50 formed in the upper plate 51 between the edge 52 of that plate and the hinge line 53. The lower plate 54 has a guide track 55 and profiled edge 56 as before. A further flexible hinge member 57 is adhered to the lower plate 54 and carries a fulling block 58 which can be received in the opening 50 when the plates are closed. Fullness can thus be introduced into a layer of fabric between the fulling block and the upper plate, as is well known in the garment industry.

The opening 50 may be formed by the apparatus described as part of the manufacturing operation also described. To do so, a second pattern is secured to the second plate 39 and the blank is moved so that the second pattern follows the stylus guide region 37a. An opening corresponding to the form of the second pattern is thus formed, the stylus depth being such that only the first plate 38 is cut.

It will be seen that the apparatus can be manufactured to be simple and relatively inexpensive, and that it allows the rapid fabrication of low cost templates. Obviously, details of the apparatus as described with reference to the drawing may be modified as required. Similarly, the sequences of manufacturing steps can be changed from those specifically mentioned.

We claim:

1. A method of making a template from a blank comprising first and second plates that overlie one another and are hinged together along a substantially rectilinear hinge line by a flexible web of material, the method comprising supporting the blank on a support table with the first plate lowermost, releasably securing a pattern to the upper surface of the second plate, positioning the blank so that it lies over a rotary cutting tool movable upwardly and downwardly through an opening in the support table with an edge region of the pattern lying against a stylus secured above the opening in the support table, the stylus having a circular periphery and being substantially in axial vertical alignment with the cutting tool, cutting a track through the thickness of both plates while moving the blank so that the edge of the pattern travels in contact with the periphery of the stylus, and making separating cuts through the thickness of the first plate only, the separating cuts extending respectively from start and finish regions of the track across the hinge line to a free edge of the first plate.

2. A method according to claim 1 in which, after cutting the track and making the additional cuts, the stylus is replaced by a second stylus of greater diameter, and the blank is moved so that the edge of the pattern travels in contact with the periphery of the second stylus while the cutter cuts through the second plate to form an additional cut extending parallel to the track.

3. A method according to claim 2 in which the additional cut extends beyond the start and finish regions of the track to a free edge of the blank.

4. A method according to claim 1 in which, after cutting the track and forming the additional cuts, an additional opening is cut through the thickness of the first plate only, the additional opening lying between the track and the hinge line but not intersecting either the track or the hinge line.

* * * * *